3,505,258
CUPRIC ABIETATE-CUMENE HYDROPEROXIDE CURE SYSTEM FOR —SH TERMINATED POLYSULFIDE POLYMER
Julian R. Panek, Newtown, and Osvaldo Lamboy, Morrisville, Pa., assignors to Thiokol Chemical Corporation, Bristol, Pa., a corporation of Delaware
Filed Sept. 30, 1968, Ser. No. 766,017
Int. Cl. C09j *3/26;* C08g *43/00*
U.S. Cl. 260—24                    17 Claims

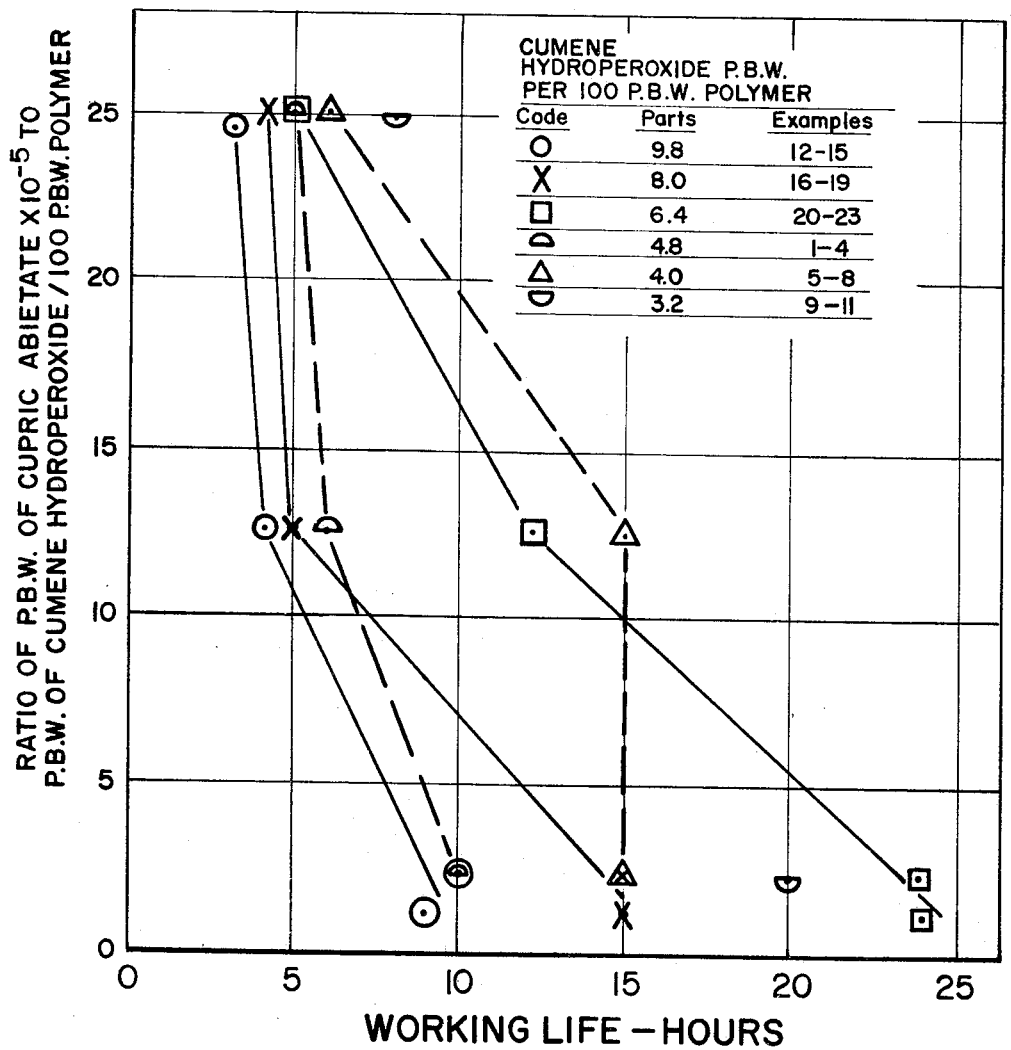

ABSTRACT OF THE DISCLOSURE

Cupric abietate is added to a cumene hydroperoxide cure system —SH terminated liquid polysulfide polymer in trace amounts and in advantageous ratios relative to the amount of cumene hydroperoxide used per 100 parts of polymer thereby obtaining an extended, predictable and controllable range of working lives for precured mixtures of the polymer and the cure system ingredients, while also providing rapid cure times.

BACKGROUND OF THE INVENTION

Field of the invention

This invention relates to the curing of —SH terminated liquid polysulfide polymers. Particularly, it relates to regulating and extending the working life and regulating the curing rate of the precured polymer in admixture with cumene hydroperoxide curing agent. More particularly, it relates to obtaining such regulated and extended working life and regulated cure rate for the precured polymer composition by utilization of trace amounts by weight of cupric abietate relative to the amount of the cumene hydroperoxide curing agent used per 100 parts of the polymer.

Description of the prior art

Liquid polysulfide polymers of the type disclosed in the Patrick and Ferguson patent, U.S. 2,466,963, and used in the practice of the present invention, are now well known and have been extensively used for a variety of commercial applications. When cured to form rubber-like solids, they possess a number of commercially important properties. They are inert to oil, most solvents, water and mild acids and alkalies, as well as to ozone and sunlight. They are tough and resilient and retain their flexibility at extremely low temperatures. Moreover, they are impermeable to gases and moisture and are capable of adhering tenaciously to such diverse materials as glass, metals, plastics, wood, leather and fabrics. Because of these valuable properties, they have been extensively used as impregnating, sealing, caulking, and coating materials as well as for a variety of special uses such as gasoline hose, printing rolls and potting compounds for electrical components.

Polysulfide polymers are characterized by the fact that they have recurring polysulfide linkages between organic radicals having at least two primary carbon atoms for connection to disulfide linkages. Thus, for example, disulfide polymers have a general structure corresponding to the formula

in which the R's are organic polyvalent radicals, preferably predominantly divalent alkylene oxahydrocarbon or thiahydrocarbon radicals such as diethyl formal radicals, and $x$ is a number greater than one which may vary from a relatively small number in the case of liquid polymers having a molecular weight of about 500 to 12,000, e.g., about 3 to 100 where R is $\text{-(CH}_2\text{CH}_2\text{)-}$, to a relatively large number in the case of solid polymers which may have a molecular weight of about 100,000 to several million. The low molecular weight polysulfide polymers, e.g., 500 to 12,000, are normally liquids at 25° C. and are preferably formed by reaction of an organic dihalide with a backbone corresponding to R with an inorganic polysulfide, such as $\text{Na}_2\text{S}_y$, $y$ usually being greater than two. Solid organic polysulfide polymers are produced thereby which may then be split according to the method of Patrick and Ferguson in U.S. 2,466,963 to provide liquid polysulfide polymers. The present invention concerns the curing of such liquid polymers, and in particular their controlled working and curing when cumene hydroperoxide is used as the curing agent.

Methods and formulations for effecting the curing, or vulcanization, of liquid polysulfide polymers by means of cumene hydroperoxide curing agent systems are known. One such system is taught in Sorg and Kutch patent, U.S. 2,933,470. Utilization of such a system is also disclosed in John and Pettit patent, U.S. 3,022,870. In each of these patents, a mixture of a finely-divided silica and cumene hydroperoxide, or an equivalent organic peroxide curing agent, is modified with maleic anhydride, or an equivalent adhesion-imparting acidic material to provide, when used to cure —SH terminated liquid polysulfide polymer, an adhesive pre-cured composition, or even a film of pre-cured adhesive material, which cures to a permanently flexible, tough, strong, adherent, solvent-resistant and pressure-resistant cured polysulfide polymer. However, the working life of such a pre-cured composition is relatively short. Thus, the composition cures in about 2 hours to a non-spreadable state. Thereafter, the composition rapidly cures to an effectively non-plastic state, with curing complete in about 12 hours at normal room temperatures. The curing reaction proceeds rapidly at temperatures as low as atmospheric temperatures, and hence, as Sorg and Kutch, above, teach the cumene hydroperoxide curing agent of the prior art compositions should not be added until immediately before the composition is to be applied to a surface to be coated.

The use of a large variety of copper salts in a polar liquid in combination with orthoanisole as a cure stabilizer and regulating composition for curable systems comprising liquid organic polysulfides and metal oxide curing agents is disclosed in Giordano patent, U.S. 3,349,057. Such use is taught to enhance the consistency and stability of the precured liquid polysulfide polymer and to render the precured composition less sensitive to changes in amounts of other recipe ingredients used. According to the patent, the copper salts are used in an amount of at least 0.005 part by weight of copper per 100 parts of liquid polysulfide polymer. As taught by Giordano, the working life of his precured liquid polysulfide polymer compositions varies widely with a constant amount of his copper salt when other ingredients are changed or modified in quantity.

SUMMARY OF THE INVENTION

The present invention is directed to overcoming the disadvantages resulting from the rapid curing properties of cumene hydroperoxide curing agent-containing —SH terminated liquid polysulfide polymers. Particularly, it is directed to extending the working life, referred to in the art as the "pot-life," of the precured polymer mixture, while maintaining a practical cure life.

It has been found that the working life of cumene hydroperoxide catalyzed —SH terminated liquid polysulfide polymer can be predictably controlled and advantageously extended to as much as 24 hours by adding to the formulation of precured ingredients trace amounts of cupric abietate. The trace amounts of cupric abietate used may be expressed as parts by weight per 100 parts of liquid polysulfide polymer. However, the effectiveness of the cupric abietate and the amount used are dependent also upon the amount of cumene hydroperoxide curing agent used per 100 parts of polymer. Accordingly, the amount of cupric abietate used is more conveniently expressed as a ratio by weight of the cupric abietate to the weight of cumene hydroperoxide used per 100 parts of the precured polymer.

Specifically, the invention comprises a working life and curing rate regulating composition for use with two-part cumene hydroperoxide curable systems of —SH terminated liquid organic polysulfide polymers wherein said polysulfide polymer has the formula $HS(RSS)_xRSH$ and wherein R is a divalent aliphatic radical selected from the group consisting of alkylene, oxahydrocarbon and thiahydrocarbon radicals preferably

and $x$ is a number between 3 and 100, preferably between about 23 and 46, the composition comprising in admixture in parts by weight per 100 parts of said polymer of a regulating agent consisting from about 0.0001 to about 0.01 part of cupric abietate, and a curing agent comprising from about 3 to about 10 parts of cumene hydroperoxide, said cupric abietate and cumene hydroperoxide preferably being admixed in a ratio by weight of cupric abietate $\times 10^{-5}$ to weight of cumene hydroperoxide used for curing 100 parts of polymer, which preferably is in the range from about $1 \times 10^{-5}:1$ to $25 \times 10^{-5}:1$ for regulating the working life.

BRIEF DESCRIPTION OF THE DRAWING

The effectiveness of the use of cupric abietate for extending working life of cumene hydroperoxide curable —SH terminated liquid polysulfide polymers according to the invention is shown in the drawing, wherein the ratio of the weight of cumene hydroperoxide in 100 parts of the —SH terminated liquid polysulfide (LP) polymer is shown plotted against the working time in hours for different amounts of cumene hydroperoxide per 100 parts of the precured polymer, as indicated by the code symbols in the drawing.

In the drawing, it is seen that when the ratio of the weight of cupric abietate is decreased from about $25 \times 10^{-5}:1$ to about $2.5 \times 10^{-5}:1$ while the weight of cumene hydroperoxide used to cure 100 parts of polymer in the composition is held constant, the working time, or working life, in hours of the precured composition increases by from about 2 to 5 times the original working life. Also, when the amount of cumene hydroperoxide is decreased at a particular cupric abietate to cumene hydroperoxide ratio, the increase in working time becomes greater as the ratio becomes smaller. Thus, it is seen that the combined effects of the cupric abietate and cumene hydroperoxide can be used to modify the working times within a broad range of hours by adjusting the ratio of the weight of cupric abietate to the weight of cumene hydroperoxide while selecting the amount of cumene hydroperoxide best adapted to obtain a faster or slower rate of cure as may be desired when using the composition as a sealant or a film-forming material, or for other uses, such as those disclosed in the prior art patents of Sorg and Kutch and of John and Pettit, above.

DESCRIPTION OF THE PREFERRED EMBODIMENTS

In order to point out more fully the nature of the present invention, the following specific examples are given of the practice of the invention for preparing cured or curable compositions.

The invention is illustrated with two commercially available —SH terminated polysulfide polymers of different molecular weights which require different amounts of cumene hydroperoxide curing agent to become cured, thus showing the effects of the cupric abietate regulating agent at two levels of addition. One of the polymers used is Thiokol LP-31, which has the formula

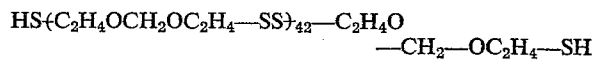

and a molecular weight of 7500. The other polymer is Thiokol LP-32, which has the formula

and a molecular weight of 4000.

The two polymers were used in the form of masterbatches, as shown in Table 1, having incorporated therein other ingredients commonly used in the preparation of a typical coating composition having adhesive properties. In the masterbatches, the Methylon 75108, a phenol-formaldehyde condensate, contributes adhesive properties to the LP-31 and LP-32 polymer compositions. The Aroclor 1262, a chlorinated biphenyl dissolved in an ester plasticizer, contributes plasticizing properties, as does the sulfur. The other ingredients serve principally as fillers.

TABLE 1

| Masterbatch | A | B |
|---|---|---|
| Recipe ingredients in parts by weight (pbw.): | | |
| LP-31 polysulfide polymer | 100 | |
| LP-32 polysulfide polymer | | 100 |
| Methylon 75108 (phenol-formaldehyde condensate) | 5 | 5 |
| Aroclor 1262, (chlorinated biphenyl, 60/40 in ester plasticizer) | 35 | 35 |
| Multifex MM (precipitated CaCO₃) | 15 | 15 |
| Icecap K (calcined clay) | 20 | 20 |
| York White (ground clay) | 16 | 16 |
| TiO₂ | 10 | 10 |
| Hi Sil 233 (hydrated silica) | 7 | 7 |
| Sulfur | 0.1 | 0.1 |
| Total | 208.1 | 208.1 |

A series of mixed curing pastes was then prepared using as the ingredients of each paste cumene hydroperoxide and cupric abietate and sufficient Aroclor 1254, a chlorinated biphenyl, to dissolve the cupric abietate. The curing pastes then were each mixed with portions of the two masterbatches in the quantities shown in Examples 1–24 of Tables 2 and 3, using 100 parts of polymer as a basis in each example. Table 2 shows results obtained with LP-31 polymer, and Table 3 shows results obtained with LP-32 polymer.

TABLE 2

| Example | 208.1 pbw. Masterbatch (100 parts) (polymer) | Curing paste, pbw. | | Ratio I:II | Working life, hours | Curing time, hours at 75° F. | Durometer Hardness | |
|---|---|---|---|---|---|---|---|---|
| | | I. Cupric abietate[1] | II. Cumene hydroperoxide | | | | After 1 hour at 158° F. | After 5 hours at 158° F. |
| 1 | A | 0.0012 | 4.8 | 25×10⁻⁵:1 | 5 | 16 | 8 | C |
| 2 | A | .0006 | 4.8 | 12.5×10⁻⁵:1 | 6 | 16 | 8 | C |
| 3 | A | .00012 | 4.8 | 2.5×10⁻⁵:1 | 10 | PC, 7 days | 4 | C |
| 4 | A | .00006 | 4.8 | 1.25×10⁻⁵:1 | NC | do | 0 | NC |
| 5 | A | .0010 | 4.0 | 25×10⁻⁵:1 | 6 | 16 | 8 | C |
| 6 | A | .0005 | 4.0 | 12.5×10⁻⁵:1 | 15 | PC, 7 days | 0 | PC |
| 7 | A | .0001 | 4.0 | 2.5×10⁻⁵:1 | 15 | do | 0 | PC |
| 8 | A | .00005 | 4.0 | 1.25×10⁻⁵:1 | NC | do | 0 | NC |
| 9 | A | .0008 | 3.2 | 25×10⁻⁵:1 | 8 | do | 0 | NC |
| 10 | A | .00008 | 3.2 | 2.5×10⁻⁵:1 | 20 | do | 0 | NC |
| 11 | A | .00004 | 3.2 | 1.25×10⁻⁵:1 | NC | do | 0 | NC |

[1] 1% solution in Aroclor 1254 (chlorinated biphenyl).
C=Cured; NC=Not cured; PC=Partially cured.

TABLE 3

| Example | 208.1 pbw. Masterbatch (100 parts) (polymer) | Curing paste, pbw. | | Ratio I:II | Working life, hours | Curing time, hours at 75° F. | Durometer Hardness | |
|---|---|---|---|---|---|---|---|---|
| | | I. Cupric abietate[1] | II. Cumene hydroperoxide | | | | After 1 hour at 158° F. | After 5 hours at 158° F. |
| 12 | B | 0.0024 | 9.8 | 24.5×10⁻⁵:1 | 3 | 16 | 13 | C |
| 13 | B | .0012 | 9.8 | 12.25×10⁻⁵:1 | 4 | 16 | 11 | C |
| 14 | B | .00024 | 9.8 | 2.45×10⁻⁵:1 | 10 | 16 | 10 | C |
| 15 | B | .00012 | 9.8 | 1.225×10⁻⁵:1 | 9 | 16 | 11 | C |
| 16 | B | .0020 | 8.0 | 25×10⁻⁵:1 | 4 | 16 | 13 | C |
| 17 | B | .0010 | 8.0 | 12.5×10⁻⁵:1 | 5 | 16 | 10 | C |
| 18 | B | .0002 | 8.0 | 2.5×10⁻⁵:1 | 15 | 24+ | 6 | C |
| 19 | B | .0001 | 8.0 | 1.25×10⁻⁵:1 | 15 | 24+ | 6 | C |
| 20 | B | .0016 | 6.4 | 25×10⁻⁵:1 | 5 | 16 | 7 | C |
| 21 | B | .0008 | 6.4 | 12.5×10⁻⁵:1 | 12 | 16 | 4 | C |
| 22 | B | .00016 | 6.4 | 2.5×10⁻⁵:1 | 24+ | 24+ | PC | PC |
| 23 | B | .00008 | 6.4 | 1.25×10⁻⁵:1 | 24+ | PC, 7 days | PC | PC |

[1] 1% solution in Arocolor 1254 (chlorinated biphenyl).
C=Cured; NC=Not cured; PC=Partially cured.

After mixing the ingredients in the usual manner, each mixture consisting of the masterbatch, curing agent and regulating agent ingredients was observed over a period of hours to determine the working life, or "pot-life" and the cure time. During this observation period, each mixture was observed as it thickened from a workable consistency, to a heavy syrup, or to a gelled, or set condition of unworkable consistency at room temperature, about 75° F. Portions of each batch were applied as coatings to aluminum, glass and wet concrete test panels for curing and testing at 75° F. and at 158° F. Adhesions of the cured compositions generally were of the same peel strengths as those usually obtained with the cumene hydroperoxide cured master batches in the absence of the cupric abietate, showing no adverse effects resulting from the use of the cupric abietate regulating agent. Since the invention concerns principally the advantages in extending working life of the precured polymer the test data shown in Tables 2 and 3 have been confined to such aspect of the test results and to the cure rates.

In Table 2, Examples 1–11 show results obtained with amounts of cupric abietate ranging from 0.00004 part to 0.0008 part as 3.2 parts of cumene hydroperoxide to from 0.00006 part to 0.0012 part of cupric abietate at 4.8 parts of cumene hydroperoxide, all at 208.1 parts of masterbatch A, containing 100 parts of LP-31. Similarly, in Table 3. Examples 12–23 show results obtained with amounts of cupric abietate ranging from 0.00008 to 0.0016 part at 6.4 parts of cumene hydroperoxide to from 0.00012 part to 0.0024 part of cupric abietate at 9.8 parts of cumene hydroperoxide, all at 208.1 parts of masterbatch B, containing 100 parts of LP-32.

The data shown under the caption "Working Life, Hours" shows the working life observed. It is to be noted, as has been plotted in the chart in the drawing, that as the amount of cupric abietate present decreases for a particular constant amount of cumene hydroperoxide, the hours of working life increase. Also, as the amount of cumene hydroperoxide decreases, the hours of working life increase. When both cupric abietate and cumene hydroperoxide are simultaneously decreased, the duration and spread of the working lives in hours increased still more.

It is important that the curing time of the cured composition be kept within practical limits, which are dependent on a particular use made of the composition. As shown in the columns in Tables 2 and 3 headed "Curing Time, Hours at 75° F.," the compositions were found to have become cured in many cases within 16 hours and in others in over 24 hours; and still other cases, the cure was only partial after 7 days. As shown in the columns in the tables headed "Durometer Hardness," cure may be accelerated by curing at an elevated temperature, e.g. 158° F.

On the basis of the test results shown in Tables 2 and 3, liquid polysulfide polymer compositions intended for use as adhesives most advantageously are those which, in the case of LP-31, are cured with about 4 parts of cumene hydroperoxide in combination with 0.001 part of cupric abietate per 100 parts of the polymer, and which, in the case of LP-32, are cured with about 8 parts of cumene hydroperoxide and 0.001 part cupric abietate per 100 parts of polymer. The working life of the LP-31 polymer-containing composition then will be about 6 hours and the cure time about 16 hours. Similarly, the working life of the LP-32 polymer-containing composition will be about 4 hours and the cure time within 24 hours.

In order to more readily predict and thereby to select the optimum amounts of cupric abietate and cumene hydroperoxide to obtain a particular period of working life in combination with a desired cure rate for the precured composition. it is convenient to express the weight of cupric abietate as a ratio to the weight of cumene hydroperoxide curing agent used in relation to 100 parts of the liquid polysulfide polymer. Since the weight of cupric abietate is in trace amounts, the quantity is conveniently expressed in whole numbers multiplied by the multiplier $10^{-5}$. Thus, as may be readily calculated, the optimum quantities of cupric abietate and cumene hydroperoxide stated above may be expressed as a ratio of $25 \times 10^{-5}:1$ for the LP-31 composition and a ratio of $12.5 \times 10^{-5}:1$ for the LP-32 composition.

From the test results in Tables 2 and 3 and the drawing, it will be obvious that a suitable working life and cure time can be selected for either LP-31 or LP-32 liquid polysulfide polymer to suit particular application conditions under which the polymer composition is to be applied and cured.

The cumene hydroperoxide used in practicing the invention may be the standard commercial product which comprises about 70% by weight cumene hydroperoxide with the remainder being other organic liquids such as alcohols and ketones. The parts of cumene hydroperoxide shown in Examples 1–23 are in parts of such 70% by weight solution. Other organic peroxides can also be used advantageously to practice the invention and include tertiary butyl hydroperoxide, 2,5-dimethylhexane-2,5-dihydroperoxide and 2,5-dimethyl-2,5-di(benzoylperoxyl)hexane. The latter two compounds have available oxygen contents of 17.9% and 8.2%, respectively compared to 10.5% for cumene hydroperoxide. The amount of any one of these organic peroxides which is used can be readily determined to obtain the amount equivalent to cumene hydroperoxide.

The cupric abietate regulating agent is a compound having the formula $Cu(C_{20}H_{29}O_2)_2$. It is used in its standard commercial form, which may be a copper resinate derived by treating rosin, which is predominantly abietic acid, with acetic acid, or by heating cupric hydroxide with avietic acid. The parts of cupric abietate shown in Examples 1–23 are in parts of such latter commercial material.

Hhe cupric abietate is preferably dissolved and used, in in practicing the invention, in a suitable organic solvent to make about a 1.0% by weight solution. Suitable solvents are alcohols, e.g. ethyl alcohol; hydrocarbon oils, e.g., naphtha; and ester plasticizers, e.g. Aroclor 1254, a chlorinated biphenyl, which are preferred.

The cumene hydroperoxide and the cupric abietate in its solvent may be mixed together and used as a paste, with or without fillers of the same type as those used in preparing the masterbatches. The mixture, commonly called a "curing paste" then is packaged separately from the masterbatch ingredients in a two-part system, in a manner well-known in the art, and is mixed with the masterbatch ingredients at about the time of intended use. However, the cupric abietate preferably also is advantageously mixed into the masterbatch as a part of the ingredients thereof and provides the same benefits when the cumene hydroperoxide curing agent is latter mixed with the master batch, or base.

Although the masterbatch compositions of the Examples 1–28 have been prepared with a phenol-formaldehyde condensate adhesion additive, it is to be understood that other adhesion additives may be substituted in the composition to obtain polysulfide polymer vulcanizates having improved adherence to the surfaces to which the composition is to be applied and then cured. Such adhesion additives include maleic anhydride and other equivalent adhesion imparting acidic materials such as dichloromaleic anhydride and itaconic anhydride, although somewhat higher proportions by weight are required of these compounds. Other adhesion additives which may advantageously be used are epoxy resins, epoxy silanes, mercaptosilanes, aminosilanes and coumaroneindene resins.

Other ingredients in the masterbatch may be varied by substitution of equivalent materials, as will be known by those skilled in the art, while still obtatining the advantages and benefits of the invention.

While only trace amounts of cupric abietate are used in practice of the invention to prolong the working life of the precured cumene hydroperoxide-catalyzed liquid polysulfide polymer, it was also found that increasing the amount of cupric abietate to about 0.01 part in the presence of about 8 parts of cumene hydroperoxide per 100 parts of LP-32 polymer cured the polymer in ¼ hour or less. This extremely rapid curing rate sharply contrasted with that obtained when as much as 0.5 part of another metal compound, e.g. stannous octoate, zinc octoate, ferric chloride or manganese acetate, was substituted for the 0.01 cupric abietate. With each of these substituents, no cure was obtained even after 6 days.

Consequently, the cupric abietate can be used either in trace amounts to regulate the working life beyond the times found practical in the prior art use of cumene hydroperoxide curing agent for —SH terminated liquid polysulfide polymers, or the cupric abietate can be used in more than trace amounts to obtain a rapid cure where working life is not critical.

The precured compositions of the present invention have been found to be particularly useful as strongly adherent sealants for wet concrete, e.g. concrete pavement and walls; metal, e.g. stainless steel or aluminum automotive body trim; and glass, e.g. window panes in buildings and vehicles. Examples 24 and 25 illustrate the physical properties and adhesion resistance to peeling of LP-31 and LP-32 polysulfide polymers prepared in accordance with the invention. It is to be noted that both in the "soft" form of cured LP-31 of masterbatch A and the hard, elastomeric form of cured LP-32 of masterbatch B the adhesion against peel of the cured compositions was from 17 to 19 lbs./inch even after immersion in water for 7 days at 75° F.

|  | Example | |
|---|---|---|
|  | 24 | 25 |
| Recipe ingredients parts by weight: | | |
| Masterbatch A (LP-31) | 208.1 |  |
| Masterbatch B (LP-32) |  | 208.1 |
| Cumene hydroperoxide | 4.0 | 8.0 |
| Cupric abietate | 0.001 | 0.002 |
| Aroclor 1254 (chlorinated biphenyl) | 1.0 | 2.0 |
| Curing conditions: | | |
| Work life at 75° F., in hours | 8.0 | 6.5 |
| Curing temperature, in ° F | 75 | 75 |
| Curing time observed, in hours | 14 | 12 |
| Physical properties of vulcanizates, on press-out: | | |
| Ultimate tensile strength, p.s.i | (¹) | 200 |
| Ultimate elongation, percent | (¹) | 730 |
| Hardness, Shore "A" durometer degrees |  | 22 |
| After 1 week standing at 180° F.: | | |
| Ultimate tensile strength, p.s.i |  | 220 |
| Ultimate elongation, percent |  | 550 |
| Hardness, Shore A degrees |  | 28 |
| Recovery at 25% compression: | | |
| After 22 hours at 73° F., percent |  | 74 |
| After 22 hours at 158° F., percent |  | 20 |
| Adhesion resistance to peeling: | | |
| After 1 week standing at 75° F. and then 7 days immersion in water: wet hydraulic cement concrete block surface, peel force lbs./inch | 19 | 17 |
| Aluminum sheet | 12 |  |

¹ Too soft to test.

Upon substitution of maleic anhydride for the Methylon 75108 in the masterbatches A and B excellent adhesion to glass and fair adhesion to aluminum were obtained with cupric abietate-cumene hydroperoxide curing paste according to the invention. When the curing was carried out for 1 hour at 158° F., the adhesion of the cured LP-31 and LP-32 polymers was excellent to both glass and aluminum even after immersion in water for 7 days.

Although certain preferred —SH terminated liquid polysulfide polymers have been used to illustrate the invention, it is to be understood that other —SH terminated liquid polymers may also be used to achieve the advantages and benefits thereof. Thus, especially good results both as to acceleration of cure, by addition of about 0.01 part of cupric abietate to our organic peroxide, e.g. cumene hydroperoxide, and extension of working life of the pre-cured polymer composition by addition of less than 0.001 part of cupric abietate have been obtained with —SH terminated polymer having a polyether-polyurethane backbone and with —SH terminated polymer having a polyether backbone. Such polymers are described in copending application Ser. No. 484,097, filed Aug. 31, 1965, now Patent No. 3,446,780, incorporated herein by reference. A specific example is poly(ethylene adipate-propylene adipate) polyester urethane polymer prepared by reacting an ethylene adipate/propylene adipate polyester glycol having a weight ratio of approximately 4:1 of ethylene adipate units to propylene adipate units and a molecular weight of approximately 2,500 with toluene diisocyanate to form an NCO-terminated prepolymer, having a molecular weight of about 2,500, which is then reacted with an hydroxyalkylene mercaptan, e.g. hydroxyethylene-mercaptan, to form the —SH terminated polymer.

We claim:

1. A method for regulating the working life and cure time a peroxide curing agent curable polymer system wherein the polymer is a —SH terminated liquid organic polysulfide polymer having the formula HS(RSS)$_x$RSH in which R is a divalent aliphatic radical selected from the group consisting of alkylene, oxahydrocarbon and thiahydrocarbon radicals and $x$ is a number in the range from 3 to 100, said method comprising admixing with said polymer a curing amount of organic peroxide curing agent and a working life and cure time regulating amount of cupric abietate.

2. The method according to claim 1 wherein the organic peroxide curing agent is cumene hydroperoxide.

3. The method according to claim 1 wherein said cupric abietate is present in from about 0.00001 to about 0.01 part by weight per 100 parts by weight of polysulfide polymer.

4. The method according to claim 1 wherein said peroxide curing agent is present as cumene hydroperoxide in from about 3 to about 10 parts by weight per 100 parts by weight of polysulfide polymer.

5. The method according to claim 3 wherein said peroxide curing agent is present as cumene hydroperoxide in from about 3 to about 10 parts by weight per 100 parts by weight polysulfide polymer.

6. The method according to claim 1 wherein said peroxide curing agent is present as cumene hydroperoxide in from about 3 to about 10 parts by weight per 100 parts by weight of polysulfide polymer and the ratio by weight of said cupric abietate to weight of cumene hydroperoxide is in the range from about $1 \times 10^{-5}:1$ to about $25 \times 10^{-5}:1$.

7. The method according to claim 1 wherein the organic peroxide curing agent is selected from cumene hydroperoxide, tertiary butyl hydroperoxide, 2,5-dimethylhexane-2,5-dihydroperoxide, and 2,5-dimethyl-2,5-di(benzoylperoxyl) hexane.

8. A curing paste for a curable polymer system wherein the polymer is a —SH terminated liquid organic polysulfide polymer having the formula HS(RSS)$_x$RSH in which R is a divalent aliphatic radical selected from the group consisting of alkylene, oxahydrocarbon and thiahydrocarbon radicals and $x$ is a number in the range from 3 to 100, said paste comprising per 100 parts of said polymer, from about 0.00001 to about 0.01 part of cupric abietate, and from about 3 to about 10 parts of cumene hydroperoxide.

9. a curable polysulfide polymer composition comprising in uniform admixture
  (a) a —SH terminated liquid organic polysulfide polymer having the formula HS(RSS)$_x$RSH in which R is a divalent aliphatic radical selected from the group consisting of alkylene, oxahydrocarbon and thiahydrocarbon radicals, and $x$ is a number in the range from 3 to 100;
  (b) cumene hydroperoxide tertiary butyl hydroperoxide, 2,5-dimethylhexane-2,5-dihydroperoxide, or 2,5-dimethyl-2,5-di(benzoylperoxyl) hexane curing agent for said polysulfide polymer; and
  (c) cupric abietate.

10. A curable polysulfide polymer based composition as in claim 9 wherein said liquid polysulfide has a molecular weight of from about 3000 to about 7500.

11. A curable polysulfide polymer based composition as in claim 9 wherein said R is an oxahydrocarbon radical.

12. A curable polysulfide based composition as in claim 9 wherein said cupric abietate is present in from about 0.00001 to about 0.01 part by weight per 100 parts of polysulfide polymer.

13. A curable polysulfide based composition as in claim 9 wherein said cumene hydroperoxide is present in from about 3 to about 10 parts by weight per 100 parts by weight of polysulfide polymer.

14. A curable polysulfide based composition as in claim 12 wherein cumene hydroperoxide is present in from about 3 to about 10 parts by weight per 100 parts by weight of polysulfide polymer.

15. A curable polysulfide based composition as in claim 9 wherein said cumene hydroperoxide is present in from about 3 to about 10 parts by weight per 100 parts by weight of polysulfide polymer and said cupric abietate is present in the ratio by weight of cupric abietate to weight of cumene hydroperoxide in the range from about $1 \times 10^{-5}:1$ to about $25 \times 10^{-5}:1$.

16. A curable polysulfide based composition as in claim 9 additionally comprising an adhesion additive.

17. A method for regulating the working life and cure time of a peroxide curing agent curable polymer system wherein the polymer is a —SH terminated liquid organic polymer, said method comprising admixing with said polymer a curing amount of organic peroxide curing agent and a working life and cure time regulating amount of cupric abietate.

References Cited

UNITED STATES PATENTS

| | | | |
|---|---|---|---|
| 3,225,017 | 12/1965 | Seegman et al. | 260—79.1 |
| 3,247,138 | 4/1966 | Jorczak et al. | 260—18 |
| 3,294,760 | 12/1966 | Hay | 260—79 |
| 3,402,134 | 9/1968 | Berenbaum et al. | 260—18 |
| 3,349,057 | 10/1967 | Giordano | 260—47.75 |

HOSEA E. TAYLOR, JR., Primary Examiner

M. I. MARQUIS, Assistant Examiner

U.S. Cl. X.R.

117—124, 125, 127, 138.8, 139.5, 148; 260—37, 77.5, 79, 79.1, 829, 830, 838